United States Patent [19]

Phillips et al.

[11] Patent Number: 4,565,719
[45] Date of Patent: Jan. 21, 1986

[54] ENERGY CONTROL WINDOW FILM SYSTEMS AND METHODS FOR MANUFACTURING THE SAME

[75] Inventors: Roger W. Phillips; Patrick K. Higgins, both of Santa Rosa; Peter H. Berning, Sebastapol, all of Calif.

[73] Assignee: Optical Coating Laboratory, Inc., Santa Rosa, Calif.

[21] Appl. No.: 433,511

[22] Filed: Oct. 8, 1982

[51] Int. Cl.⁴ .............................................. E06B 3/24
[52] U.S. Cl. ...................... 428/34; 428/216; 428/433; 428/469; 428/457; 428/458
[58] Field of Search ............... 428/433, 469, 457, 458, 428/463, 34

[56] References Cited

U.S. PATENT DOCUMENTS

| | | | |
|---|---|---|---|
| 3,034,924 | 5/1962 | Kraus | 117/106 |
| 4,234,654 | 11/1980 | Yatabe et al. | 428/333 |
| 4,235,048 | 11/1980 | Gillery | 428/433 |
| 4,321,300 | 3/1982 | Farrauto | 428/433 |
| 4,414,254 | 11/1983 | Iwata et al. | 428/433 |

FOREIGN PATENT DOCUMENTS

| | | | |
|---|---|---|---|
| 50199 | 4/1982 | European Pat. Off. | 428/469 |
| 2219126 | 9/1974 | France . | |
| 38251 | 4/1981 | Japan | 428/469 |
| 36448 | 3/1983 | Japan | 428/469 |

*Primary Examiner*—Edith Buffalow
*Attorney, Agent, or Firm*—Flehr, Hohbach, Test, Albritton & Herbert

[57] ABSTRACT

An energy control sheet, including a highly transparent substructure having first and second surfaces, a substantially transparent, thin film metal layer formed on one surface of the substructure, and a highly transparent thin film dielectric layer formed over said metal layer. The dielectric layer comprises a mixed metal oxide layer having metal constituents of at least one lanthanide series metal (e.g. cerium oxide) and at least one transition or semiconductor metal (e.g. tin oxide). The dielectric layer is characterized by substantial water vapor impermeability so that the weatherability of the energy control sheet is substantially improved. The metal layer is either a silver layer or a silver-palladium alloy.

33 Claims, 16 Drawing Figures

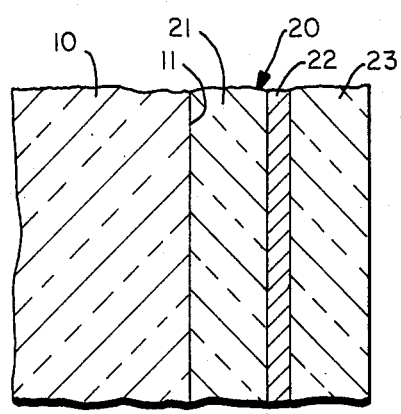
FIG.—1
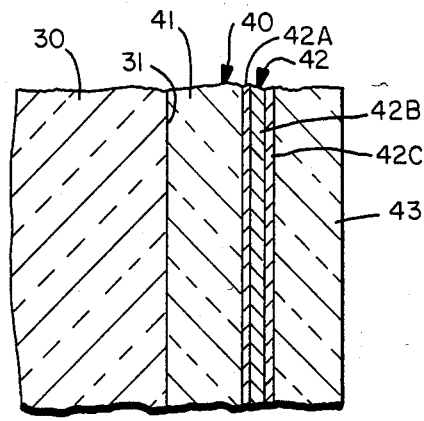
FIG.—2
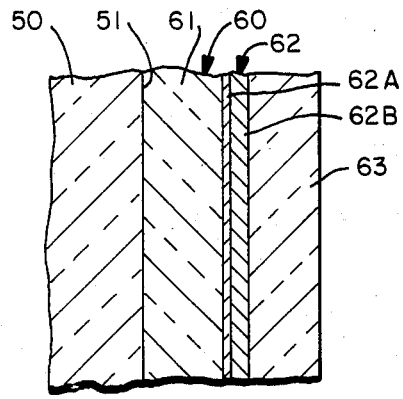
FIG.—3
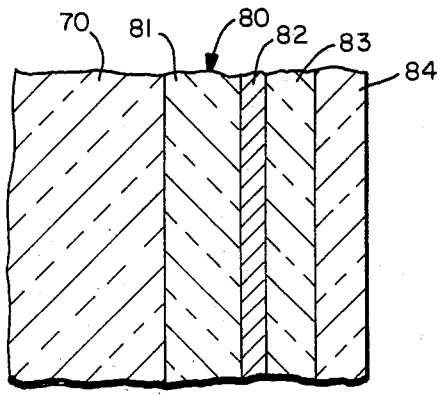
FIG.—4
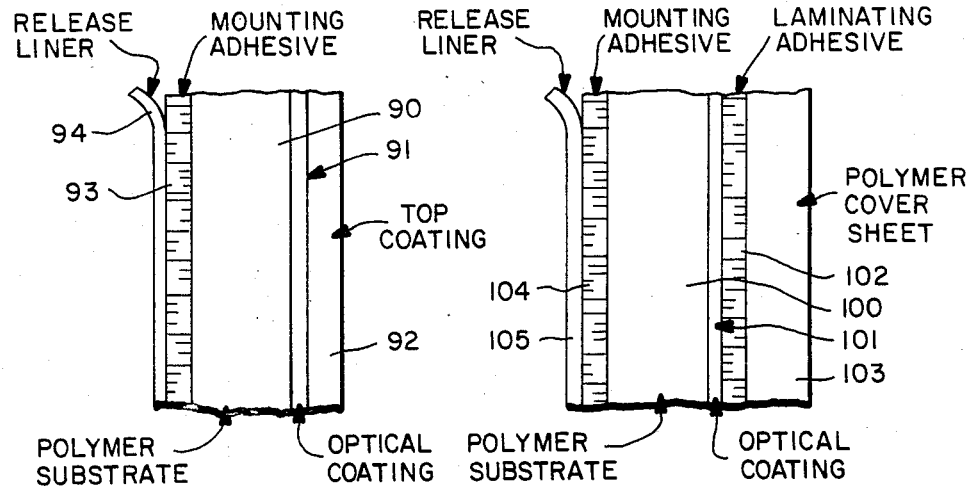
FIG.—5
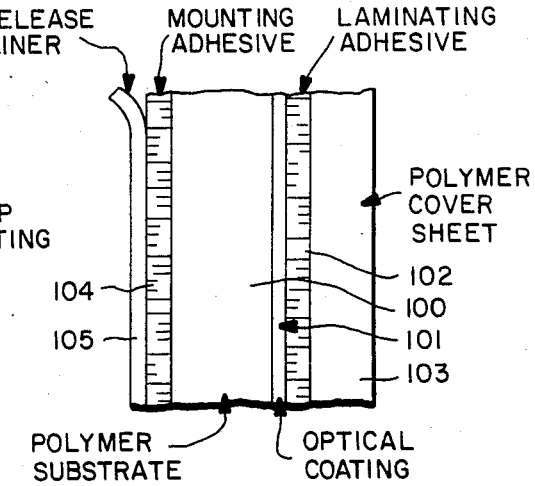
FIG.—6

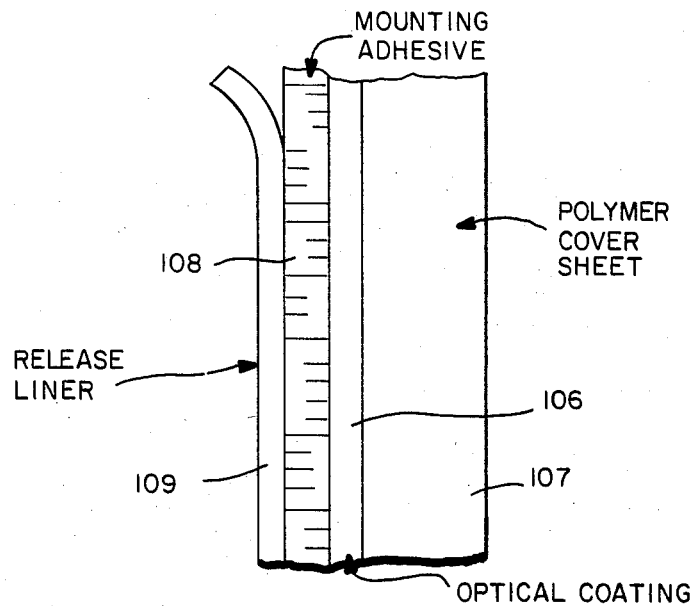
FIG.—7
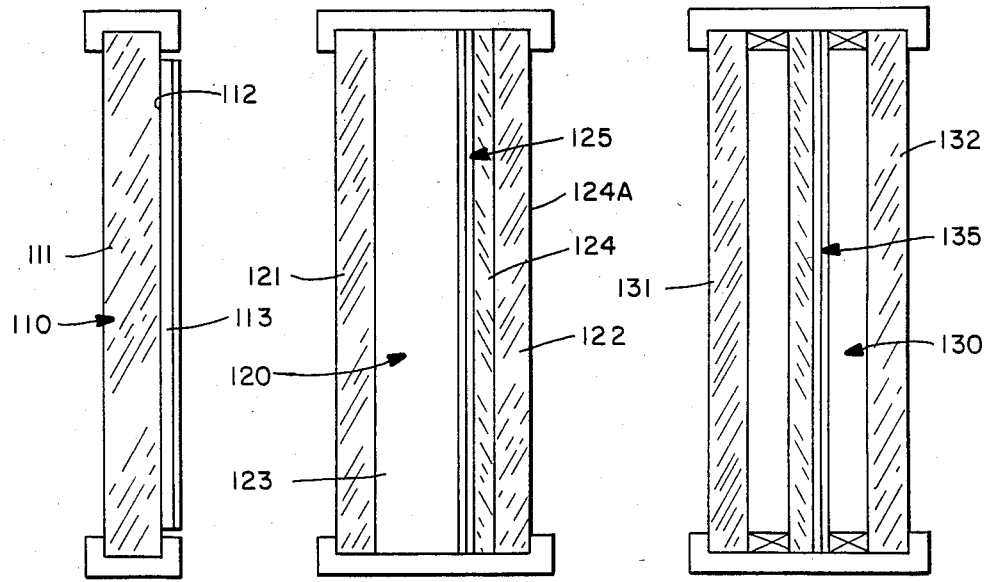
FIG.—8  FIG.—9  FIG.—10

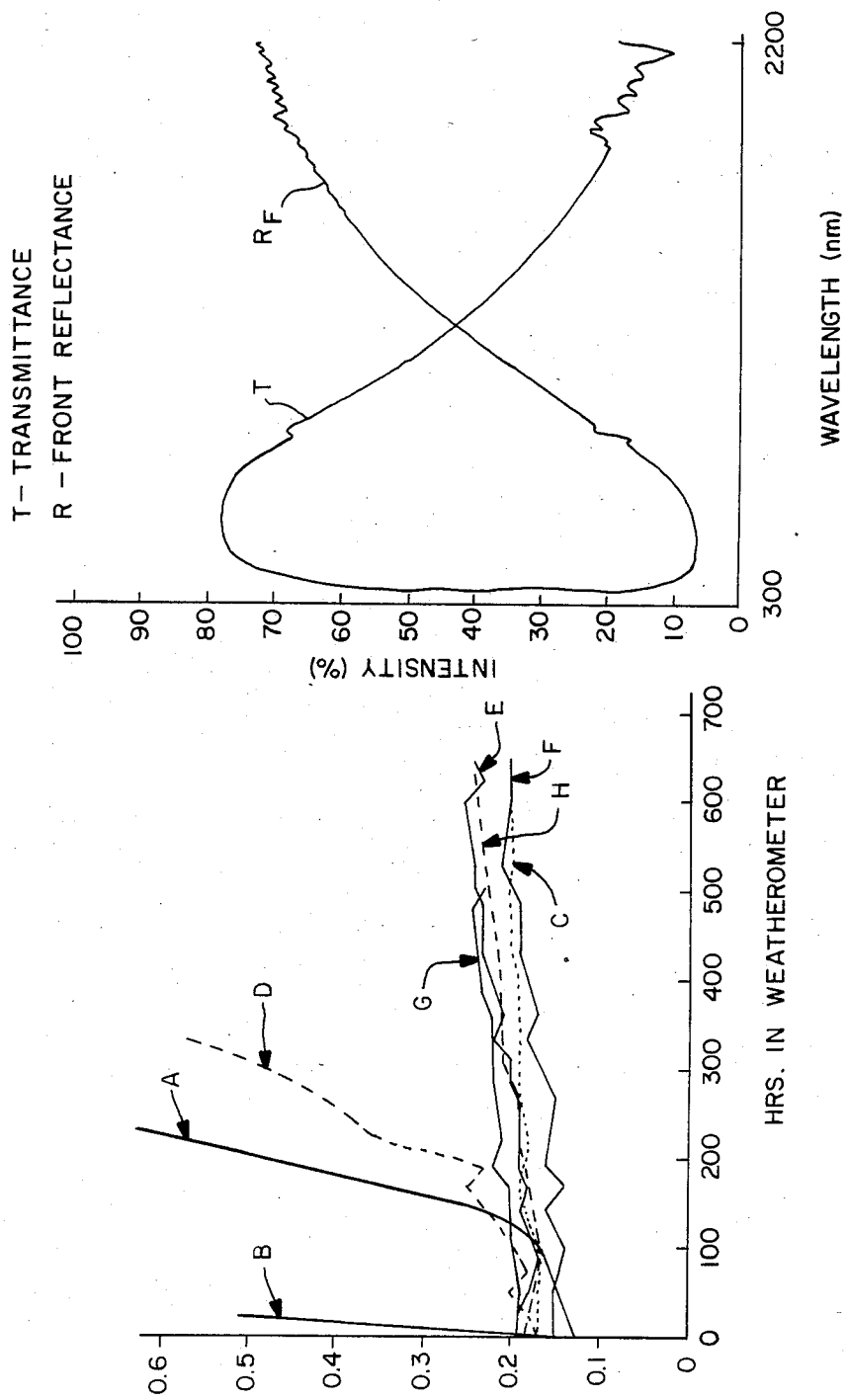

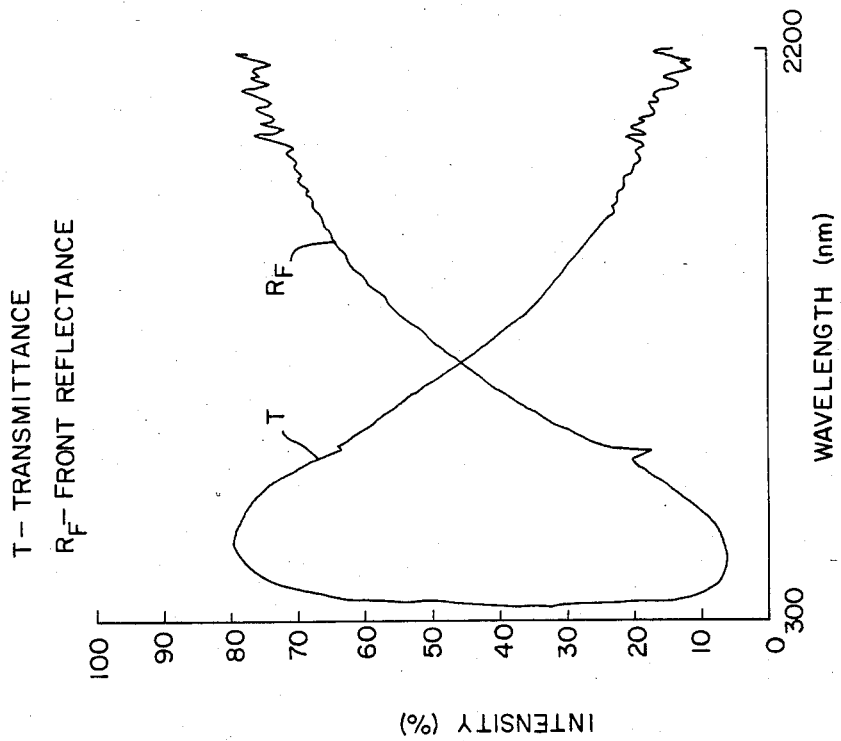
FIG.—14
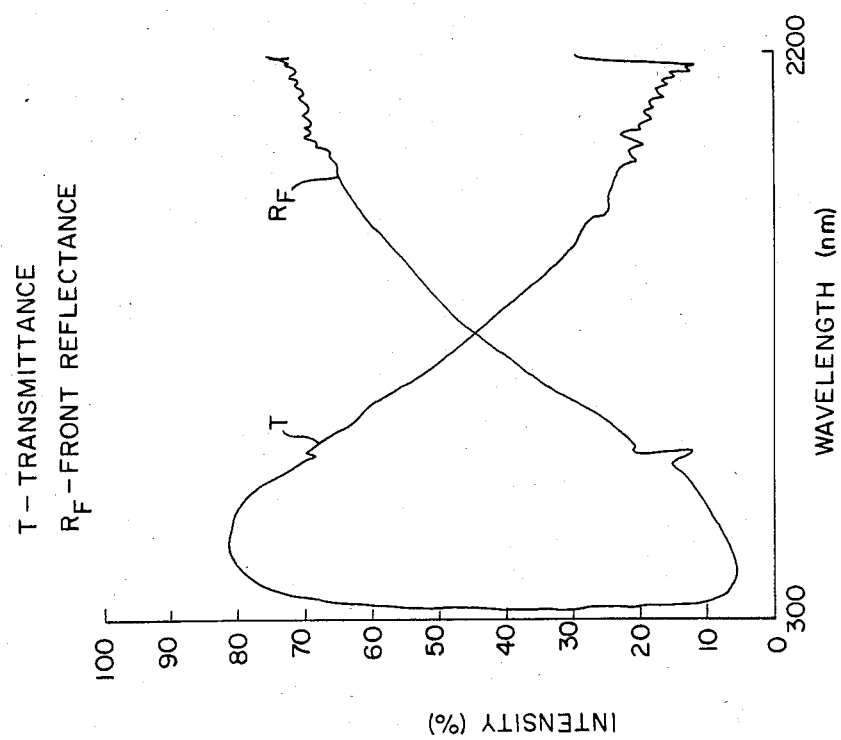
FIG.—13

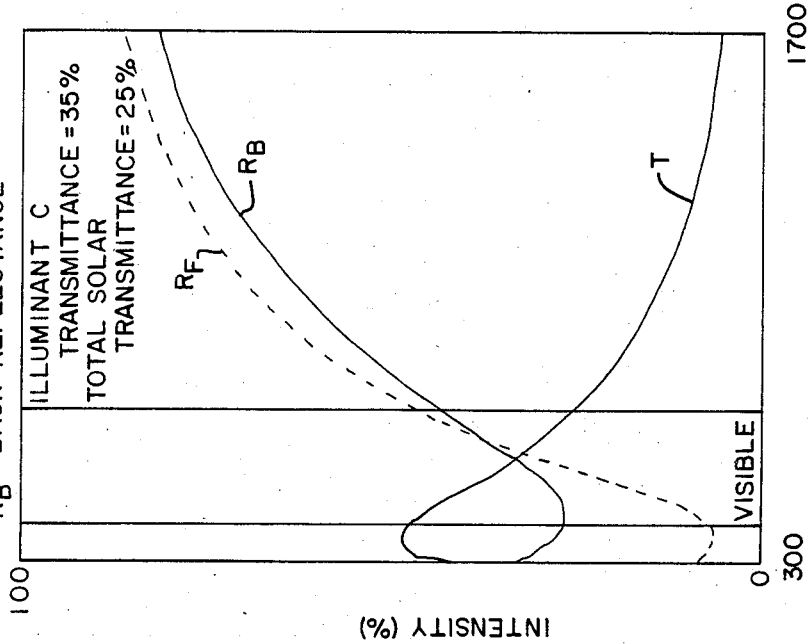
FIG.—16
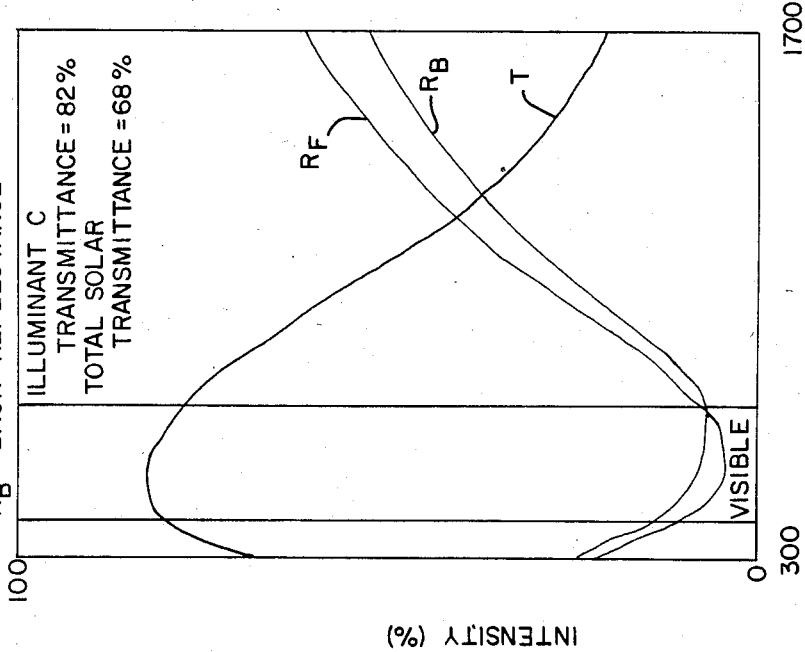
FIG.—15

ENERGY CONTROL WINDOW FILM SYSTEMS AND METHODS FOR MANUFACTURING THE SAME

This invention relates generally to thin film optical coatings and more specifically to such coatings designed for energy control purposes such as energy control window films and the like.

It has been known for some time that the solar and infrared radiation response characteristics of typical transparent glazing materials used in homes and commercial buildings can be usefully altered by application thereto of energy control sheets employing thin film optical coating technology. Initially, energy control sheets typically employed a flexible polymer substrate coated with a thin film of aluminum to provide relatively high reflectance and low transmittance of solar radiation to reduce the solar heat load otherwise transmitted through the glazing materials. However, as a result such energy control sheets inherently also had very high reflectance and low transmittance of visible light and thus drastically affected the ability to see through the glazing system.

Thin films of aluminum could not provide the type of spectral selectivity required for energy control sheets of the winter film type which require high transmittance of visible and solar energy with high reflectance of the far infrared and low thermal emissivity.

More recently, energy control sheets utilizing a thin film of metals such as copper, silver, and gold (in pure and alloy forms) in multi-layer thin film optical coating systems have been provided to achieve improved spectral selectivity and durability. Energy control sheets of this type are disclosed for example in U.S. Pat. Nos. 4,234,654 and 4,320,169 and in the co-pending and commonly assigned U.S. patent application Ser. No. 308,025, filed Oct. 2, 1981, now U.S. Pat. No. 4,463,047 and entitled "Flexible Selective Energy Control Sheet and Assembly Using the Same." In addition, an energy control sheet using a flexible polymer substrate and a thin film layer of silver sandwiched between dielectric layers of indium oxide is currently being marketed by Southwall Corporation of Palo Alto, California.

The Yatabe, et al. '654 patent teaches the use of a metal-dielectric thin film optical coating system by using a thin film metal layer consisting of a small amount of gold alloyed with silver to substantially improve the environmental stability of the metal film. While the use of such a silver-gold alloy contributes substantially to enhancing the long-term durability of an energy control film, gold is an exceedingly expensive material to use. Accordingly, there remains a need for optical coatings and energy control film systems which can simultaneously achieve high optical and thermal performance and a long-term durability without the use of highly expensive alloy materials such as gold.

Accordingly, it is the principal object of this invention to provide an energy control sheet having good optical and thermal performance and improved long term durability at low manufacturing cost.

It is another object of this invention to provide an energy control sheet having proved long-term durability without the use of highly expensive noble metals.

It is another object of this invention to provide an energy control window film with good optical performance characteristics and which can be economically and efficiently produced in a high rate roll coating apparatus.

This invention is based on the surprising discovery that the environmental stability and durability of a thin film silver layer is dramatically increased by either alloying the silver layer with a relatively small amount of palladium or by forming a composite of very thin "flash" layers of palladium on one or both sides of the thicker layer of silver. Another aspect of this invention is based on the surprising discovery that at least certain mixed metal oxide layers having metal constituents from the lanthanide series and from the transition or semiconductor series not only can be vacuum deposited with good coating transmittance but also provide a very high degree of environmental protection to underlying thin film metal layers. Such mixed oxide dielectric layers thus provide dramatically increased environmental stability for thin film layers of silver (and other metals) in either pure or alloy form. The combination of these discoveries enables the production of energy control films with very good optical performance and superior long-term durability.

Accordingly, one aspect of this invention features an energy control sheet which employs a highly transparent substructure with a substantially transparent, thin film metal layer formed on one surface of the substructure and a highly transparent thin film dielectric layer formed over the metal layer. The dielectric layer comprises a mixed metal oxide layer having metal constituents of at least one lanthanide series metal and at least one transition or semiconductor metal and is characterized by substantial water vapor impermeability, thereby resulting in a substantially improved weatherability of the energy control sheet.

In a presently preferred embodiment the lanthanide series metal is cerium and the transition or semiconductor metal is tin and the mixed metal oxide layer includes the relative concentrations of cerium and tin in the range of 20:80 weight percent to about 70:30 weight percent. More preferably, the relative concentrations of cerium and tin are in the range of about 20:80 weight percent to about 55:45 weight percent, since the greater percentage of tin in the oxide layer appears to be a major contributor to improving the weatherability of the energy control sheet system.

In a preferred embodiment of an energy control sheet, the thin film metal layer comprises either an alloy of silver and palladium or a composite of separately formed layers of silver and palladium. In the alloy layer system, silver is the principal constituent of the thin film metal layer and palladium is preferably in a concentration in the range of about 1 weight percent to about 15 weight percent. For a winter film type of energy control sheet utilizing another dielectric layer of cerium-tin oxide underneath the metal layer, the preferred concentration of palladium is in the range of about 1 weight percent to about 5 weight percent. In embodiments in which the thin film metal layer initially comprises a composite of separately formed layers of palladium and silver, it is preferable to first form a layer of palladium on the substrate to a thickness which causes the $T^2$ transmission of the substrate plus coating to drop by 5-30 percent. Thicknesses in this range cannot be accurately measured, but it is believed to be in the range of about 5 to 25 Angstroms. Then a thin continuous film layer of silver is formed to a thickness of about 60 to 100 Angstroms. This system may further include a second layer of palladium formed on top of the layer of silver to a thickness in the same range as the first layer.

The preferred mixed cerium oxide and tin oxide layer may be formed either by evaporating a mixture of cerium oxide and tin oxide from a single source, co-depositing cerium oxide and tin oxide from separate sources or by evaporating a single source of the compound cerium stannate (50 mole % $CeO_2$, 50 mole % $SnO_2$). In this method, the step of depositing the thin film metal layer may comprise either a simultaneous evaporation of silver and palladium from separate sources to produce a silver-palladium alloy film, or sputtering a silver-palladium alloy source, or wire feeding a silver-palladium alloy to the single source, or sequentially depositing a very thin layer of palladium followed by deposition of a thicker layer of silver, followed by deposition of a very thin layer of palladium.

Another aspect of this invention features an energy control sheet having winter film characteristics with transmittance in the visible and solar portions of the electromagnetic radiation spectrum greater than about 70 and 60 percent, respectively, and with infrared emittance less than 0.2. This energy control sheet features a highly transparent substrate having first and second surfaces with the first thin film layer carried on one surface of the substrate comprising a highly transparent dielectric material having a refractive index of 1.8 or greater and a physical thickness at about 300–550 Angstroms. A thin film metal layer is carried on the first thin film dielectric layer and includes constituents of silver and palladium with silver in a total concentration of at least 85 percent and palladium in a concentration in the range of about 1 weight percent to about 15 weight percent. The metal layer has a total thickness of about 100 Angstroms. A second dielectric layer structure is carried on the metal layer and includes at least one layer of dielectric material formed directly on the metal layer and having a refractive index of 1.8 or greater with said second dielectric layer overall having a physical thickness of about 300–550 Angstroms. As previously indicated, the thin film metal layer may comprise either an alloy of silver and palladium in the recited ranges of concentrations or separately formed composite layers of palladium and silver. Furthermore, in a preferred version of such a winter film energy control sheet, the dielectric layers between which the silver-palladium thin film metal layer is sandwiched are comprised of mixed metal oxides having metal constituents of at least one lanthanide series metal, preferably cerium, and one transition or semiconductor metal, preferably tin.

The use of silver and palladium together in the metal layer either as an alloy layer or as a composite sandwich layer, provides the substantial advantage of improved weatherability of the energy control sheet. When utilized in an energy control sheet of the winter film type, optical and thermal performance characteristics generally comparable to films using a deposited silver layer are achieved but with dramatically improved weatherability. The use of mixed oxide layers in accordance with this invention confers additional weatherability improvements on the energy control sheet. Furthermore, the mixed oxide layers may be readily formed in vacuum evaporation apparatus without the requirement of a reactive oxygen atmosphere to produce highly transparent thin film dielectric layers required for good winter film optical performance. Utilization of the dielectric and metal materials in accordance with this invention thus enables the formation of a low cost, superior energy control sheet which not only provides for excellent optical and thermal characteristics but can also be expected to last for a substantially longer period of time than energy control sheets formed from individual or combined dielectric and metal material systems known in the prior art.

The mixed metal oxide dielectric layers in accordance with this invention may be utilized with other metal layers to improve overall weatherability of the resulting energy control sheet. The use of a silver-palladium alloy as the metal layer in energy control sheets may be utilized with other dielectric systems to achieve satisfactory window film performance in at least some applications. The combined use of mixed metal oxide dielectric layers and silver-palladium metal layers in accordance with this invention achieves excellent optical and thermal characteristics with weatherability equal to or superior to any other energy control sheet system disclosed in the prior art. It should of course be understood that the improvements in weatherability achieved in using the mixed metal oxide layers of this invention could also be utilized in connection with a metal layer employing other silver alloys, or "flash" layers of one metal encasing the silver layer.

Other objects, features and advantages of this invention will be apparent from a consideration of the following detailed description taken in conjunction with the accompanying drawings.

FIG. 1 is a fragmented section view of one embodiment of an energy control sheet in accordance with this invention.

FIG. 2 is a fragmented section view of an alternative embodiment of an energy control sheet in accordance with this invention.

FIG. 3 is a fragmented section view of another embodiment of an energy control sheet in accordance with this invention.

FIG. 4 is a fragmented section view of still another embodiment of an energy control sheet in accordance with this invention.

FIGS. 5 and 6 are fragmented schematic illustrations of typical energy control sheet assemblies employing a flexible polymer substrates and adhesive systems for mounting the energy control sheet to transparent glazing materials.

FIG. 7 is a fragmented section view of still another embodiment of an energy control sheet in accordance with this invention.

FIGS. 8–10 are schematic illustrations of various arrangements for mounting an energy control sheet on or within a glazing unit.

FIG. 11 is a graph showing measured thermal emittance versus number of hours in a Weather-O-Meter TM for a variety of energy control sheet structures of the winter film type including prior art designs and energy control sheets in accordance with this invention.

FIG. 12 is a graph of the measured spectral transmittance and reflectance response characteristics of an unlaminated energy control sheet in accordance with this invention and of the winter film type utilizing a mixed cerium-tin oxide layers and a silver-palladium alloy layer.

FIG. 13 is a graph of the measured spectral transmittance and reflectance response characteristics of an unlaminated energy control sheet in accordance with this invention and utilizing cerium-tin oxide layers together with a silver layer in a winter film design.

FIG. 14 is a graph of the measured spectral transmittance and reflectance response characteristics of an unlaminated energy control sheet in accordance with this invention utilizing cerium-tin oxide layers together with a sandwich of silver and palladium layers in a winter film design.

FIG. 15 is a graph of the theoretical spectral transmittance and reflectance response characteristics of an energy control sheet in accordance with this invention in which two different dielectric layers are provided on top of the metal layer in a winter film design.

FIG. 16 is a graph of the theoretical spectral transmittance and reflectance response characteristics for an energy control sheet in accordance with this invention utilizing cerium-tin oxide together with a multi-layer of silver and palladium in a summer film design.

In general, depending on the application, energy control sheets are designed to have certain desired optical and thermal performance characteristics. For example, energy control sheets of the winter film type preferably have high transmittance of both visible light and solar insolation, high reflectance in the far infrared and thus low thermal or infrared emittance. An energy control sheet of the winter type thus transmits a maximum amount of solar energy through the glazing unit while maintaining a low thermal emittance to reduce air-to-air heat transfer through the unit. The high reflectance for the far infrared enables the energy control film mounted to a monolithic glazing to reflect back into the interior of the room the infrared energy emitted from objects and persons within the interior of the structure. Energy control films of the winter film type are thus particularly useful in applications where the highest energy usage by the structure is for space heating.

In contrast, the desirable properties of an energy control sheet of the summer film type involves a controlled transmittance in the visible with substantial reduction of transmittance for total insolation. It is generally desirable that an energy control sheet of the summer type also possess the low thermal emissivity and thus high reflectance for the far infrared. Summer films are desirably utilized in applications where the maximum energy usage for space conditioning is for cooling.

In addition to the general optical and thermal performance characteristics desirable for energy control sheets of the winter film and summer film types, it is also desirable in winter film designs to achieve substantial neutral color performance of the film (transmitted on reflected light) over the visible portion of the spectrum. In summer films, depending on the design characteristics of the coating, either neutral coloration or substantially uniform coloration from one energy control sheet to another is desirable so that uniform coloration will be perceived for adjacent glazing units on the same structure. This is especially important in structures in which a substantial number of large glazing units are mounted in side-by-side relation.

One of the overriding problems involved in early energy control sheet design was the lack of durability or weatherability of the higher performance type reflective metal layers utilized in the energy control film structure. The optical and thermal performance of the energy control sheet is highly dependent on the stability and integrity of the overall optical coating and, in particular, the stability and integrity of the metal reflective layer utilized in the film structure. To provide some protection for the energy control sheet, the prior art has typically utilized an overcoat layer or laminated protective layer which tends to assist in sealing out moisture and other deleterious substances which can cause corrosion or otherwise adversely affect the metal reflecting layer in the film structure. As is known in the art, it is desired that any such overcoat or laminated protective layer have high transmittance in the visible portion of the spectrum and be highly transmitting also in the infrared portions of the spectrum so that for instance, in the use of monolithic glazings with the coating on the inside surface, the thermal or infrared energy originating from within the structure will not be absorbed in the overcoat or protective layer where it could then be lost by conduction to the outside through the energy control sheet and the glazing unit (i.e. so that the overcoat does not substantially mask or offset the low emittance of the energy control coating).

The design and production of a high quality energy control sheet of the winter film type involves dealing with a number of design considerations which contribute to the durability and performance of the winter film. FIG. 1 of the drawings shows the structure of a typical winter film involving a substrate 10 with an optical coating 20 carried on one surface 11 of the substrate 10. The optical coating 20 comprises a first layer of transparent dielectric material 21, a thin layer 22 of a reflecting metal material and a layer 23 of transparent dielectric material formed over the layer 22 of metal material. High optical transmittance in the visible is achieved by designing the thicknesses of the dielectric layers 21 and 23 to provide a high degree of induced transmittance through the optical coating 20. The overall optical and thermal performance of the energy control sheet is highly dependent on the physical and optical characteristics of the metal layer 22 and the dielectric layers 21 and 23.

To achieve high optical transmittance for visible light the dielectric layers 21 and 23 preferably have a high index of refraction (greater than 1.8) as well as high transparency (i.e. low absorption). For high transmittance of visible light, it is desirable that the metal layer 22 be made as thin as possible. However, for good thermal performance including low thermal emissivity and high reflectance in the far infrared, it is necessary that the metal layer 22 be a continuous metal film with low electrical resistivity. It is thus seen that the optical and thermal performance of the optical coating 20 involves conflicting performance factors, and thus materials and design optimization of the winter film coating is a challenging task.

The design of the optical and thermal performance must also take into consideration factors which determine the overall durability and weatherability of the energy control sheet and also the capability to manufacture the energy control sheet with good production yields. It should be apparent that it is necessary not only to achieve good initial optical and thermal performance for the energy control sheet, but that optical and thermal performance must be maintained over a long period of time to have a satisfactory commercial product. In addition, the overall energy control sheet must be manufacturable at relatively low cost to be commercially attractive.

The durability and weather resistance of the energy control sheet depends on a number of factors. One of the important factors is the inherent corrosion resistance of the metal layer 22. The thermal emissivity of the energy control sheet substantially increases if the metal layer 22 corrodes to an oxide or sulphide or other chemical compound with attendant increase in electrical resistivity. In addition, some desirable metals such as silver tend to reagglomerate over a period of time which also increases the electrical resistivity of the film with accompanying increase in thermal emissivity.

Another important factor in the durability and weatherability of a energy control sheet is the degree of adhesiveness of the optical coating 20 to the surface 11 of the substrate 10, and the adherence of the separate coating layers to each other. A good optical and thermal performance of the overall energy control sheet will not be maintained if separation between the optical coating and the substrate or between coating layers occurs. Durability and weatherability also depend on the degree to which the dielectric layers 21 and 23 provide effective barriers to moisture and other substances which tend to corrode the metal layer 22. In addition, the high optical transparency of the dielectric layers 21 and 23 must be maintained over a long installed film lifetime in order to maintain good optical performance.

The manufacturability of the energy control sheet is also materials oriented in that the deposition of the dielectric layers 21 and 23 should preferably be able to be carried out in a high speed roll coater without using a reactive evaporation technique, i.e. evaporation of metal oxide dielectric materials in an activated oxygen environment. Preferably the materials of the dielectric layers 21 and 23 should be adapted for relatively fast deposition while maintaining good thin film characteristics including high optical transparency.

Table 1 below gives both minimum and preferred performance criteria for optical, thermal and durability performance of an unlaminated, not top-coated energy control sheet of a winter film type. $T_v(\%)$ is called the percent average daylight transmittance and is defined as the average percent transmittance over the visual wavelength range of 400–700 nanometers weighted against an illuminant source which approximates the noonday sun conditions and the photopic eye response curve. The performance factor $T_s(\%)$ represents the percent solar transmittance which is defined as the average percent transmittance over the wavelength range of 0.35 microns to 2.2 microns weighted against Moon's $AM_2$ Solar Curve. $\epsilon$ represents the front thermal emittance which is defined as the total hemispherical emittance of the film measured from the coated surface at a temperature of approximately 20° C. The color factors are the apparent visual color of the film as perceived with visible transmitted or (outside) reflected light.

TABLE 1

| WINTER FILM PERFORMANCE CRITERIA | | |
|---|---|---|
| Performance Factor | Minimum | Preferred |
| $T_v$ (%) | >70% | ~80% |
| $T_s$ (%) | >60% | >65% |
| $\epsilon$ (thermal emittance) | <0.20 | <0.15 |
| Color (Reflected or Transmitted) | (Uniform, low purity) | Neutral |
| Weather-O-Meter ™ Exposure | >200 hours | >>200 hours |
| Humidity Test | 240 hours | >240 hours |
| Temperature Test | 240 hours | >240 hours |

The weatherometer factor involves the test cycles set forth in Table 2 below. The objective of the weatherometer test is to determine the theoretical long-term life expectancy of the window film through accelerated exposure using an Atlas Model Ci-35 Weather-O-Meter ™. The humidity test involves exposing the energy control sheet to an environment with relative humidity in excess of 95% at a temperature of 50° C. The temperature test involves exposing the film to a dry atmosphere at 80° C. Failure of the film in the Weather-O-Meter ™, humidity, and temperature tests is defined as the time when the thermal emittance $\epsilon$ has increased to a value twice its initial value, (before testing begins). Failure of the films also occurs when visible inspection shows coating failure due to separation or visual appearance degradation. The emittance increase failure criterion is based on the observation that the rate of degradation of the film is very substantial when the emittance value has reached a value twice that of the initial value and the initial value is ≦0.2. This will be seen in data presented and discussed below. All of the performance criteria set forth in Table 1 are for an energy control sheet in the form shown in FIG. 1, with the optical coating 20 in an unprotected state, i.e. without any top coating or laminated coversheet applied thereto.

TABLE 2

| Weather-O-Meter ™ Test Cycles |
|---|
| All samples mounted on 2½ × 2½ × ⅛" glass with the glass side facing the source. The samples were tested under the following environmental conditions: |

| | |
|---|---|
| Irradiance Level: | 0.55 W/m² at 340 nm |
| Light/Dark Cycle: | 20 hours light/4 hours dark |
| Sample Temperature: | Light Cycle: 60° C. |
| | Dark Cycle: 20° C. |
| Relative Humidity: | Light Cycle: 50% RH |
| | Dark Cycle: >90% RH |

The U.V. exposure in the Weather-O-Meter ™ is calculated to have the equivalent exposure of 5.35 times that of U.V. exposure in Miami, Fla.

FIGS. 1–4 illustrate the characteristics of various designs of energy control sheets utilizing materials and structures in accordance with this invention. As previously indicated, FIG. 1 shows an optical coating 20 formed on surface 11 of a substrate 10. Typically the substrate 10 will be a flexible polymer sheet such as polyethylene terephthalate (PET) although a wide variety of other polymer substrate materials, such as polyethylene, polypropylene and polyacrylonitrile, could also be utilized. The invention could also be utilized in embodiments in which the optical coating 20 is formed directly on a substrate which forms a part of the glazing unit itself, i.e. with substrate 10 being a rigid sheet of either transparent glass or a polymer material.

Each of the dielectric layers 21 and 23 comprises a mixed metal oxide layer having metal constituents of at least one lanthanide series metal and at least one transition or semiconductor metal and is characterized by substantial water vapor impermeability which imparts improved weatherability to the energy control sheet. In a preferred embodiment the dielectric layers 21 and 23 comprise a mixed cerium oxide and tin oxide layer. For good winter film optical performance each of the dielectric layers 21 and 23 perferably has a thickness in the range of about 300 Angstroms to about 550 Angstroms with the first layer 21 generally put down at a thickness of about 500 Angstroms and the second layer 23 put down at a thickness in the above range which maximizes the visual transmittance through the overall film for this combination of layers.

It has been discovered that in addition to providing substantial water vapor impermeability, cerium-tin oxide layers have excellent adherence to polymer substrates and thus do not require the use of any separate adhesion layer on the substrate surface.

The metal layer 22 may comprise either pure silver having a thickness in the range of about 75 to 150 Angstroms or, more preferably, an alloy of palladium and silver with the palladium concentration in the range of about one weight percent to about five weight percent. The thickness of the silver-palladium alloy film 22 is preferably in the range of about 70-150 Angstroms. As depicted in the graph of FIG. 11, and as set forth in the Table 3 below, satisfactory overall winter film performance is achieved when relatively optimum concentrations of cerium and tin are utilized in the cerium-tin oxide dielectric layers 21 and 23 when either pure silver or an alloy of silver and palladium is utilized as the metal layer 22.

FIG. 11 and Table 3 below also illustrate that the minimum performance criteria for a winter film is met when a silver-palladium alloy layer is utilized with other dielectric layers such as titanium dioxide due to the higher corrosion resistance of the silver-palladium alloy layer. Thus, while a perferred embodiment of this version of the invention involves a combined use of cerium-tin oxide as the dielectric layers 21 and 23 and silver-palladium alloy as the metal layer 22, it should be understood that the invention also encompasses the use of cerium-tin oxide with other metals as the metal layer 22 and also the use of a thin layer of silver-palladium alloy in conjunction with other transparent dielectric materials for the dielectric layers 21 and 23.

The optical characteristics of a thin film layer of silver-palladium alloy are not as good as the optical characteristics of a silver layer itself. However, it has been discovered in accordance with this invention that a thin film layer of silver-palladium alloy becomes a continuous, low electrical resistivity film at a substantially lower thickness value than is required when depositing a silver film. The ability to utilize a thinner layer of the silver-palladium alloy offsets substantially the degradation in optical performance of the metal layer resulting from the use of palladium in the alloy layer. A discussion of the theory behind the performance of the silver-palladium alloy layer and ability to achieve a metal film continuity and low resistivity at lesser values of layer thicknesses will be given below.

It has been determined that for good optical quality, i.e. high visual and solar transmittance, it is necessary to have a concentration of cerium in the mixed oxide layer of about twenty weight percent. In addition, it has been discovered that for achieving a substantial water vapor impermeability and thus improved weatherability of the energy control sheet, it is necessary to have at least about thirty weight percent tin in the cerium tin oxide layer. Moreover, it appears that the relative concentrations of cerium and tin in the cerium-tin oxide layer should be in the range of about 20:80 weight percent to about 70:30 weight percent. Because of the relative importance of the water vapor impermeability which appears to be largely conferred by the tin oxide content of the mixed oxide layer, it has been found preferable to maintain the relative concentrations of cerium and tin in the range of about 20:80 weight percent to about 55:45 weight percent.

TABLE 3

| # COATING DESIGN | Wt. (%) Ce Sn | $T_x$ (%) (Initial) | $T_\sigma$ (%) (Initial) | $\epsilon$ (Initial) | Weather-O-Meter ™ [a] Hrs. to Fail |
|---|---|---|---|---|---|
| 1. In$_2$O$_3$/Ag/In$_2$O$_3$ (Southwall) | — | 86 | 70 | 0.13 | 144 |
| 2. ZnS/Ag/ZnS roll-coated | — | 80 | 72 | 0.10 | 24 |
| 3. CeSnO$_4$/Ag/CeSnO$_4$ batch-coated | 49.1, 50.9 | 80 | 68 | 0.17 | 210 |
| 4. CeSnO$_4$//Ag—Pd/CeSnO$_4$ batch-coated | 49.6, 50.4 | 78 | 66 | 0.19 | 650+ |
| 5. CeSnO$_4$/Pd/Ag/Pd/CeSnO$_4$ batch-coated | 49.4, 50.6 | 78 | 65 | 0.15 | 650+ |
| 6. CeSnO$_4$/Ag—Pd/CeSnO$_4$ roll-coated | 51.6, 48.4 | 77 | 66 | 0.19 | 504+ |
| 7. TiO$_2$/Ag—Pd/TiO$_2$ batch-coated | — | 79 | 72 | 0.18 | 650+ |
| 8. TiO$_2$/Ag—Au/TiO$_2$ batch-coated | — | 82 | 68 | 0.17 | 650+ |

[a] + = removed from Weather-O-Meter ™

FIG. 2 illustrates an alternative version of this invention comprising a transparent substrate 30 and an optical coating 40 formed on one surface 31 of substrate 30. In this embodiment the optical coating 40 also comprises a pair of dielectric layers 41 and 43 with a composite metal layer 42 therebetween. The composite metal layer 42 comprises a first thin layer 42A of palladium, a layer 42B of silver and a second thin layer 42C of palladium. The palladium layers 42A and 42C are preferably formed to a thickness which causes the $T^2$ transmission of the substrate plus coating to drop by 5-30 percent. Although films of this thickness cannot be accurately measured, it is believed the thickness is in the range of about 5-25 Angstroms. The lower end of the palladium thickness range is preferred. Because of the thinness of these layers they are sometimes referred to herein as "flash" layers of palladium. The intermediate silver layer is preferably formed to a thickness in the range of about 60 Angstroms to about 100 Angstroms. The formation of the initial flash palladium layer 42A enables the formation of a continuous silver film at about 90% of the thickness required for a pure silver layer to become continuous. The grain size of the silver is also considerably reduced. Transmission electron microscope (TEM) photographs have revealed that silver in the presence of palladium has a grain size of about 60 Angstroms whereas pure silver films have a grain size of about 300 Angstroms.

The composite palladium-silver-palladium metal film 42 exhibits substantially the same improved weatherability as is exhibited by the silver palladium alloy film discussed above in connection with FIG. 1. This improved weatherability is shown in the graph of FIG. 11 and the Table 3 given above. Because of the improved weatherability of the silver-palladium composite layer 42, substantially improved winter film weatherability can be achieved utilizing a wide variety of materials for the dielectric layers 41 and 43. However, as discussed in conjunction with FIG. 1, it is preferable to utilize a mixed metal oxide layer having metal constituents of at least one lanthanide series metal and at least one transition or semiconductor metal, and in particular it is preferable to form the dielectric layers 41 and 43 from a mixed metal oxide wherein the metal constituents are cerium and tin. The same relative percentages of cerium and tin in the mixed metal oxide layer as discussed above are preferably utilized in dielectric layers 41 and 43 in this embodiment.

FIG. 3 illustrates another version of this invention which comprises a transparent substrate 50 and an optical coating 60 formed on one surface 51 of substrate 50. Optical coating 60 comprises a pair of transparent dielectric layers 61 and 63 with a composite thin film metal layer 62 therebetween. In this case the composite layer 62 comprises a flash layer of palladium 62A and a layer of silver 62B formed over the flash palladium layer 62A. Similar to the composite metal film version shown in FIG. 2, it is preferable to form the flash palladium layer 62A to a thickness in the range of about 5 to 25 Angstroms and to form the silver layer 42B to a thickness in the range of about 60 to 100 Angstroms.

FIG. 4 illustrates an alternative winter film design which utilizes three layers of dielectric material in the optical coating 80 formed on substrate 70. In this case the transparent dielectric layers 81 and 83 are high refractive index layers. The third transparent dielectric layer 84 may be, for example, a low index layer chosen for some special property that it may contribute to the overall winter film system. To achieve the same optical performance, the second dielectric layer 83 will generally be formed as a thinner layer and the optical thickness of the composite of dielectric layers 83 and 84 will be such as to maximize the transmission of visible light through the winter film structure for this particular combination of layers. The thin metal layer 82 generally represents any of the silver-palladium alloy or composite layers discussed above in connection with FIGS. 1-3. The transparent dielectric layers 81 and 83 are preferably mixed metal oxide layers as described above and in particular are preferably mixed cerium-tin oxide layers to achieve the optimum weatherability characteristics for the energy control sheet.

FIGS. 5 and 6 illustrate the alternative versions of complete energy control sheet structures which utilize a flexible polymer sheet as the substrate material and which either have a top coating or laminated cover sheet formed over the optical coating carried on the polymer substrate. In the embodiment of FIG. 5, substrate 90 carries an optical coating 91 and a top coating 92 formed over the optical coating 91. The optical coating 91 may be any of the optical coating designs 20, 40, 60 and 80 depicted in FIGS. 1-4. The top coating 92 may utilize any suitable polymeric, organic, or inorganic material generally having a thickness ranging between 2.5 and 50 microns. The top coating 92 is preferably highly transmissive for the far infrared wavelengths since the top coating will generally be facing the interior of a structure and it is preferable to avoid substantial absorption of the far infrared heat rays emanating from objects within the structure which would effectively increase the emittance of the coated surface. On the surface of the polymer substrate opposite the optical coating 91 a mounting adhesive layer 93 is formed and a release liner 94 may be provided over the mounting adhesive 93 to cover the mounting adhesive layer until the energy control sheet is applied to a glazing unit.

In the embodiment of FIG. 6, a polymer cover sheet 103 is applied over the optical coating 101 formed on substrate 100 utilizing a laminating adhesive layer 102. A mounting adhesive layer 104 is formed on the other side of the polymer substrate 100 and may be covered with a release liner 105 to be peeled away when the energy control sheet is to be applied to a glazing unit. While a top coating or laminated protective layers may be employed in winter film designs, it would be preferable to avoid their use since they tend to increase the thermal emissivity of the overall structure and thus substantially degrade winter film thermal performance.

FIG. 7 illustrates another final product configuration for the energy control film. In this case, the optical coating 106 is deposited directly onto the polymeric cover sheet 109. This cover sheet is a polymeric film selected for its low infrared absorption so that the inherent emittance of the deposited coating of the designs depicted in FIGS. 1-4 is not affected or is only minimally degraded by the cover sheet. The mounting adhesive 108 is applied to the other side of the deposited coating and a release liner 109 is applied to the adhesive layer. At the time of installation, the release liner is stripped from the mounting adhesive and the window film control sheet is pressed into place on the window pane.

FIGS. 8-10 illustrate various approaches to mounting energy control sheets of the type provided in accordance with this invention on glazing units of different types. In FIG. 8 the glazing unit 110 utilizes a single sheet 111 of glazing material and the energy control sheet 113 (usually including a laminated protective sheet) is mounted on the inside surface 112 of the glazing sheet 111. This mounting approach is generally satisfactory for summer film designs but is less efficient for winter film designs.

In FIG. 9 a glazing unit 120 is illustrated having a pair of glazing sheets 121 and 122 with an intervening dead air space 123 therebetween. In this arrangement the energy control sheet 125 can be mounted on either of the air space surfaces of 121 or 122 as regards air-to-air heat transfer. Obviously such a mounting of the energy control sheet 125 can only be accomplished by the manufacturer of the glazing unit as it is being assembled. For the retrofit market, i.e. where the double pane glazing unit 120 has already been installed, the energy control sheet 125 would be mounted on the interior surface 124A of the glazing sheet 122.

FIG. 10 illustrates another embodiment of a double pane glazing unit 130 in which the energy control sheet 135 is mounted in a stretched fashion between the outside glazing sheet 131 and the inside glazing sheet 132. This mounting arrangement can also be accomplished only during assembly of the overall glazing unit 130.

FIG. 11 illustrates comparative Weather-O-Meter TM test data for winter films of various designs mounted on glass but not topcoated or laminated. Optical and other performance data for the winter film systems shown in the Graph of FIG. 11 are set forth in Table 3. As illustrated in Table 3, the initial thermal and optical performance of each of the coating designs, including designs in accordance with the prior art and designs in accordance with this invention are generally comparable. However, as shown by curve A in FIG. 11, the Southwall coating design (No. 1 in Table 3) utilizing indium oxide as the dielectric layers and silver as the metal layer failed after about 144 hours in the Weather-O-Meter ™. At this point, the emissivity of the film had doubled to about 0.26 and the slope of the emissivity versus Weather-O-Meter ™ hours curve is such that accelerated deterioration of the silver layer in the design had obviously begun to occur at this time.

A coating design utilizing zinc sulfide as the dielectric layer and pure silver as the metal layer (coating design 2 in Table 3) failed after only about 24 hours in the Weather-O-Meter ™ as shown by curve B in FIG. 11. Curve C shown in FIG. 11 corresponds to the Weather-O-Meter ™ data on coating design No. 8 in Table 3 which utilizes titanium dioxide in the dielectric layers and a silver-gold alloy layer generally in accordance with the teachings of the Yatabe et al. U.S. patent referred to above. This coating did not fail the testing in the Weather-O-Meter ™ (See FIG. 11). This represents substantially improved weatherability over the use of silver alone in the previously discussed prior art coating designs. However, gold is a very expensive alloy material. Furthermore, $TiO_2$ can not be high rate vacuum at ambient temperatures without visible light absorption using conventional thermal evaporation methods.

Curve D in FIG. 11 corresponds to Weather-O-Meter ™ data on a energy control sheet utilizing mixed cerium-tin oxide (cerium and tin at respective 49:51 weight percents) for the dielectric layers and silver as the metal layer. This is coating design No. 3 in Table 3. Compared to the zinc sulfide-silver and indium oxide-silver coating designs previously discussed, the use of a cerium-tin oxide/silver design substantially improved the weatherability of the energy control sheet with coating failure at about 210 hours in the Weather-O-Meter ™.

Curves E, F and G in FIG. 11 represent the weatherometer data for the coatings listed as designs 4, 5 and 6 respectively in Table 3. These curves illustrate that the coating designs 4, 5 and 6 have dramatically improved weatherability. Testing in the Weather-O-Meter ™ was discontinued after 650 hours. Weatherability performance comparable to the use of a silver-gold alloy layer is achieved with good overall optical performance characteristics.

Curve H in FIG. 11 illustrates the Weather-O-Meter ™ data for the coating design No. 7 in Table 3. As shown in FIG. 11, this coating design showed good Weather-O-Meter ™ durability comparable to those designs of 4, 5 and 6. This illustrates the dramatically improved weatherability for coating designs utilizing silver palladium alloys in the metal film layer. Similar performance would be expected for composite silver-palladium metal layers in an otherwise identical coating design.

In each of the coating designs 3, 4, 5 and 6 listed in Table 3, the cerium-tin oxide layer was formed by evaporating cerium stannate and the relative concentrations of cerium and tin in the dielectric layers was about 50 weight percent cerium and 50 weight percent of tin. In coating design No. 4, the relative concentration of palladium in silver was four weight percent. Based on other tests that have been performed, increasing the palladium content of the silver-palladium metal layer generally produces further improvements in weatherability of an energy control sheet with some accompanying degradation in optical performance of the coating design.

In coating design No. 5 in Table 3, the flash layers of palladium on both sides of the silver were deposited to a thickness corresponding to a change in transmittance and the silver layer itself was formed to a thickness that resulted in a continuous metal layer. The coating design No. 6 in Table 3 utilized 3 weight % palladium and silver in the alloy metal film layer and the silver-palladium layer thickness was such that it formed a continuous metal layer.

The data in Table 3 and the graphs of FIG. 11 illustrate the improvements in weatherability which are achievable utilizing the principles of this invention. Overall weatherability substantially greater than that required for good lifetime of energy control sheets may be achieved by using the mixed cerium-tin oxide layers with pure silver or utilizing an alloy metal layer of silver and palladium with other types of metal oxide dielectric layers, with best results achieved by combining the use of cerium-tin oxide as the dielectric layers with silver and palladium in alloyed or composite thin film form as the metal film.

FIGS. 12–14 are graphs of the spectral transmittance and reflectance of energy control sheets utilizing the coating designs identified as numbers 4, 3 and 5 respectively in Table III above. The generally comparable optical performance of these coating designs is illustrated in these graphs. Each of the graphs shows that the coating designs achieve peak transmittance in the visual wavelength region between 400 and 700 nanometers and also have a fairly high transmittance band in the solar energy spectrum between 0.35 and 2.2 microns. These graphs further illustrate that the transmittance of the coating falls off very substantially in the far infrared region above 4 microns. While overall optical performance of coating designs using palladium along with silver in the metal layer are somewhat degraded from coating designs using silver alone, the amount of degradation is surprisingly small in view of the dramatically improved weatherability which is achieved. As previously stated, this is largely due to the ability to utilize thinner metal layers in the palladium-silver designs than is possible with a pure silver layer.

FIG. 15 shows the theoretical spectral transmittance and reflectance for a winter film coating design of the type shown in FIG. 4 utilizing an outer dielectric layer 84 of silicon oxide. In this case the dielectric layer 83 was formed from an oxide having a refractive index n approximately equal to 2.0 and has a physical thickness of about 300 Angstroms. The silicon oxide layer 84 has a thickness of about 300 Angstroms. A table of theoretical optical performance data for this four layer coating design is superimposed on the graph of FIG. 15 and illustrates that comparable optical performance can be achieved in such a four layer design.

The developments in regard to the use of Ag/Pd alloys or multilayer Pd/Ag/Pd coatings together with $CeSnO_x$ films to produce durable winter film type architectural coatings have immediate extension to possible use in the production of high performance summer films. Here a larger percentage of Pd can be utilized for added durability while still allowing for very competitive performance. As an example FIG. 16 shows calculated reflectance and transmittance curves for a theoretical four-layer coating design consisting of a Pd/Ag/Pd multilayer and an outer film of $CeSnO_x$ and having a $T_v$ of 35%. In this design the palladium layer thicknesses are each 40 Angstroms, the silver thickness is 120 Angstroms and the CeSnO$_x$ thickness is 300 Angstroms. As can be seen, the design has good selective properties, in particular comparatively high reflectance at the longer (non-visible) wavelengths, which provides good solar shading characteristics along with reasonably high daylight transmittance.

Table 4 below sets forth the optical performance data and Weather-O-Meter ™ test data for winter film coating designs utilizing substantially identical coating design parameters but varying the relative percentage concentrations of cerium and tin in the cerium-tin oxide dielectric layer. The metal layer is a composite flash palladium/silver/flash palladium design having a palladium thickness corresponding to a transmittance change of 5%. The silver thickness was deposited at a thickness at which the metal film became continuous, approximately 60–80 Angstroms. The data in Table 4 demonstrates that minimal weatherometer specifications can not be achieved with cerium-tin oxide dielectric layers that contain less than about 40 weight % tin.

Table 5 below sets forth the optical performance data and Weather-O-Meter ™ test data for winter film coating designs utilizing substantially identical coating design parameters but varying the relative percentage concentrations of cerium and tin in the cerium-tin oxide dielectric layers. The metal layer sandwiched between the cerium-tin oxide layers is in each instance a silver-palladium alloy having palladium in a concentration of about 7 weight percent and at a layer thickness necessary to achieve metal continuity (i.e. 60–80 Angstroms). From this data, it can be seen that the optical performance of the winter film coating is degraded at a faster rate for that design having the lower tin content, i.e. the emittance is higher after 600 hours in the Weather-O-Meter ™. The data also shows that minimal Weather-O-Meter ™ specifications can be achieved with cerium-tin oxide dielectric layers having tin contents in excess of about 30 weight %.

Table 6 lists various compositions of cerium-tin oxide films on 1 mil polyester and their respective optical properties. The data shows that the absorptance of the dielectric layer reaches a minimum when the cerium content reaches about 20 weight %.

The data in Tables 3–6 demonstrate that the preferred range of relative concentrations of cerium and tin in the cerium-tin oxide layer is in the range of about 20:80 weight percent to about 55:45 weight percent. In this range both good optical performance and good weatherability are achieved.

The mixed metal oxide dielectric layers utilized in accordance with this invention may be formed using a variety of methods. Separate sources of lanthanide series metal oxide and a transition or semiconductor metal oxide may be co-evaporated to form the mixed metal oxide layer on the substrate. The relative evaporation rates of the two metal oxides may be adjusted to control the relative concentrations of the lanthanide series metal and the transition or semiconductor metal in the final dielectric film deposited on the substrate. Another approach that can be utilized is to mix the lanthanide series metal oxide and the transition or semiconductor metal oxide in a single evaporation source so that both the metal oxides are simultaneously evaporated from the single source. The relative concentrations of the two different metal oxides may be varied in the source mixture, taking into account the differences in vapor pressures and evaporation rates of the two different oxides, to control the final relative concentrations of respective metal constituents in the deposited mixed metal oxide layer.

TABLE 6

COMPOSITION OF CeO$_2$ IN SnO$_2$ NECESSARY TO PRODUCE CLEAR FILMS ON PET OF λ/2 THICKNESS AT 550 NM.

| Run # | Atomic % Ce | Atomic % Sn | % T$_s$ | % T$_y$ |
|---|---|---|---|---|
| Uncoated Polyester | — | — | 88.3 | 87.5 |
| 1001-1623 | 3.1 | 96.9 | 73.6 | 75.6 |
| 1001-1624 | 7.3 | 92.7 | 76.9 | 79.7 |
| 1001-1625 | 15.0 | 85.0 | 78.9 | 81.6 |
| 1001-1626 | 18.2 | 81.8 | 81.2 | 82.3 |
| 1001-1627 | 17.7 | 82.3 | 81.6 | 83.5 |
| 1001-1687 | 41.1 | 58.9 | 83.1 | 82.0 |

Another approach may be taken where the lanthanide series metal and the transition or semiconductor metal will form a single chemical compound oxide. For example, in the case of cerium and tin, the compound cerium stannate may be formed. Cerium stannate may then be utilized as a single evaporation source. Although the cerium oxide and tin oxide evaporated from cerium stannate have slightly different evaporation

TABLE 4

COMPOSITIONS OF DIELECTRIC ALLOY (Ce—Sn—O) IN FILMS HAVING THE DESIGN PET/CeSnO$_x$/Pd/Ag/Pd/CeSnO$_x$ VERSUS WEATHER-O-METER ™ DURABILITY

| | Hrs. In | Film Composition | | Optical Data | | |
|---|---|---|---|---|---|---|
| Run # | Weather-O-Meter ™ | Sn (Wt %) | Ce (Wt %) | Initial E | Initial T | Initial T$_s$ |
| 1001-1510 | 40 (E = .34) | 26.8 | 73.2 | .15 | 81 | 66 |
| 1001-1557 | 600+ (E = .23) | 42.2 | 57.8 | .14 | 79 | 65 |
| 1001-1473 | 800+ (E = .16) | 53.3 | 46.7 | .13 | 79 | 65 |

TABLE 5

COMPOSITIONS OF DIELECTRIC ALLOY (Ce—Sn—O) IN FILMS HAVING THE DESIGN PET/CeSnO$_x$/Ag—Pd/CeSnO$_x$ VERSUS WEATHER-O-METER ™ DURABILITY

| | Initial | Emittance | Film Composition | | Optical Data | |
|---|---|---|---|---|---|---|
| Run # | Emittance | at 600 Hrs. | Sn (Wt %) | Ce (Wt %) | Initial T$_y$ | Initial T$_s$ |
| 1001-1558 | 0.20 | .36 | 33.7 | 66.3 | 76 | 67 |
| 1001-1539 | 0.19 | .23 | 49.4 | 50.6 | 78 | 68 | rates, substantially constant relative weight percentages of cerium and tin in the deposited dielectric layer may be achieved by utilizing a continuous feed of fresh cerium stannate source material into the source crucible in the evaporation chamber.

Because of the widely different vapor pressures of silver and palladium, it is generally not feasible to form the silver-palladium alloy layer utilized in some embodiments of this intention by evaporating silver and palladium from a single mixed source. However, a single source of silver and palladium may be utilized if sputtering equipment is employed. Using sputtering equipment, the relative concentrations of silver and palladium in the metal layer deposited on the film will be substantially the same as the relative concentrations in the source. An alternative approach is to co-evaporate silver and palladium from two separate sources. In this case the relative evaporation rates of the silver and palladium would be controlled to determine the final silver-palladium alloy film composition. The composite silver-palladium layers depicted in FIGS. 2 and 3 of the drawings would typically be formed by sequential evaporations of palladium and silver.

The discovery that silver-palladium metal layers confer dramatically improved durability and weatherability to metal-dielectric optical coatings for use in energy control sheet systems involves two surprising factors. The first is that relatively small amounts of palladium, either in an alloy film or a composite metal film perform so well in stabilizing the primarily silver layer. The second is that the addition of small amounts of palladium to the primarily silver metal layer do not as drastically affect the desirable optical properties of the silver layer as would generally be expected from known characteristics of palladium.

Palladium is known to be a "gray" metal, i.e. it does not have good optical properties in and of itself because of the nearly comparable values of the real and imaginary parts of the complex refractive index of palladium. The complex refractive index of a material is expressed as $n - ik$, where n is the real component of the refractive index and k is the extinction coefficient. The value of the ratio of $k/n$ is generally utilized as an indication of the quality of the optical properties of the material. To obtain high transmittance values with a metal layer of any reasonable thickness the ratio $k/n$ must be a large number. Although the measurements of the precise n and k values of materials such as silver and palladium are difficult and tend to be somewhat dependent on the thicknesses of the material, it is well known that the value of $k/n$ for palladium is roughly two across the visible spectrum where the corresponding value of $k/n$ for silver is a much larger number, approximately 60. The value of $k/n$ for gold varies from about 2 to about 30 across the visible spectrum and is thus a good potential transmitter at longer visible wavelengths.

Although the materials and optical properties of silver-palladium alloy and composite films are not completely understood at this point, it appears that the use of a small amount of palladium in an alloy layer or as a flash layer prior to deposition of the silver layer causes the combined silver-palladium layer to have basically the micro-structural properties of palladium while having substantially the same optical properties as silver. Investigations, including transmission electron microscopic studies, performed to date indicate that the silver-palladium alloy and the palladium flash-silver films have a much finer grain structure than a silver layer, this finer grain structure being characteristic of a palladium layer. Furthermore, the silver-palladium alloy layers become continuous at a thickness of about 90% of that for a pure silver layer. Apparently, the silver-palladium alloy and composite layers tend to nucleate in the same manner as palladium.

Furthermore, the small amounts of palladium in a silver-palladium alloy or composite film appear to substantially reduce the surface migration of silver. In other words the presence of palladium appears to immobilize the silver atoms and retain them in position on the underlying substructure. The higher melting point of palladium (m.p. = 1549 degrees Centigrade) versus silver (m.p. = 961 degrees Centigrade) would tend to reduce atomic mobility in the thin metal layer. The combination of the smaller grain size and the film nucleation to continuity and low resistivity at lower thickness values enables a thinner overall metal film to be used in the metal-dielectric optical coating for winter film designs. Accordingly, the deterioration of the optical properties of the alloy film with the presence of palladium may be largely compensated for by using a thinner layer. The long term durability of the silver-palladium films may also be partly attributable to improved adhesion of the alloyed or composite metal layer to the underlying oxide layer. The small grains of the metal layer may indicate more bonding sites (i.e. nucleation sites) at the oxide interface for films prepared from silver and palladium than those prepared from silver alone.

Various embodiments of this invention have been described above in connection with the use of a mixed metal oxide layer having metal constituents of one lanthanide series metal and one transition or semiconductor metal, for example, cerium from the lanthanide series and tin as a semiconductor metal. It should be understood, however, that the invention is not limited to the use of one metal from each group but more complex mixed metal oxide layers utilizing more than one metal constituent from the lanthanide series and/or more than one metal constituent from the transition or semiconductor metals could also be utilized. At present, there is no known enhancement to be achieved utilizing more than one metal constituent from each group. Accordingly, it is preferred from a simplicity and cost standpoint simply to use a single metal constituent from each of the recited groups.

Various embodiments of the invention have also been described above in connection with the use of alloy and composite layers of silver and palladium. It should be understood that this invention is not limited to the use of alloy or composite layers comprising only silver and palladium since similar results might also be achieved utilizing small quantities of other metals, particularly in the alloy form of the silver-palladium layer.

While this invention has been described above in connection with various specific versions and embodiments, it should be understood that persons skilled in this art could make numerous changes and adaptations of the general principles of this invention without departing from the scope of the invention as set forth in the following claims.

What is claimed is:

1. In an energy control sheet, a highly transparent substructure having first and second surfaces; a substantially transparent, thin film metal layer formed on one surface of said substructure; and a highly transparent thin film dielectric layer formed over said metal layer, said dielectric layer comprising a mixed metal oxide layer having metal constituents of at least one lanthanide series metal and at least one transition or semiconductor metal and being characterized by substantial water vapor impermeability, said lanthanide series metal being cerium and said transition or semiconductor metal being tin and each of said dielectric layers includes relative concentrations of cerium and tin in the range of about 20:80 weight percent to about 70:30 weight percent, whereby the weatherability of said energy control sheet is substantially improved.

2. In an energy control sheet, a highly transparent substructure having first and second surfaces; a substantially transparent, thin film metal layer formed on one surface of said substructure; and a highly transparent thin film dielectric layer formed over said metal layer, said dielectric layer comprising a mixed metal oxide layer having metal constituents of at least one lanthanide series metal and at least one transition or semiconductor metal and being characterized by substantial water vapor impermeability, said lanthanide series metal being cerium and said transition or semiconductor metal being tin and each of said dielectric layers includes relative concentrations of cerium and tin in the range of about 20:80 weight percent to about 55:45 weight percent, whereby the weatherability of said energy control sheet is substantially improved.

3. The article of either of claims 1 or 2, wherein said thin film metal layer comprises an alloy of silver and palladium with palladium in a concentration in the range of about one weight percent to about fifteen weight percent.

4. The article of either of claims 1 or 2, wherein said thin film metal layer initially comprises a composite of separately formed layers of palladium and silver.

5. The article of claim 4, wherein said thin film metal layer initially comprises a thin film layer of palladium formed on said substrate to a thickness in the range of about 5 Angstroms to about 25 Angstroms and a thin film layer of silver formed on said layer of palladium to a thickness in the range of about 60 Angstroms to about 100 Angstroms.

6. The article of claim 5, wherein said thin film metal layer further comprises at least initially a second layer of palladium formed on said layer of silver to a thickness in the range of about 5 Angstroms to about 25 Angstroms.

7. The article of either of claims 1 or 2, wherein said transparent substructure comprises a highly transparent substrate and a second highly transparent, thin film dielectric layer formed on one surface of said substrate said thin film metal layer being formed on said dielectric layer, each of said thin film dielectric layers has a thickness in the range of about 300 Angstroms to about 500 Angstroms, and said thin film metal layer has a thickness in the range of about 60 Angstroms to about 120 Angstroms and comprises an alloy of silver and palladium with palladium in a concentration in the range of about one weight percent to about ten weight percent and silver in a concentration of at least about 90 weight percent.

8. The article of either of claims 1 or 2, wherein said transparent substructure comprises a highly transparent substrate and a second highly transparent, thin film dielectric layer formed on one surface of said substrate said thin film metal layer being formed on said dielectric layer, each of said thin film dielectric layers has a thickness in the range of about 300 Angstroms to about 500 Angstoms; and said thin film metal layer at least initially comprises a composite of separately and sequentially formed layer of palladium and silver having a total thickness in the range of about 60 Angstroms to about 100 Angstroms.

9. The article of claim 8, wherein said thin film metal layer initially comprises a thin film layer of palladium formed on said substrate to a thickness in the range of about 5 Angstroms to about 25 Angstroms and a thin film layer of silver formed on said layer of palladium to a thickness in the range of about 60 Angstroms to about 100 Angstroms.

10. The article of claim 9, wherein said thin film metal layer further comprises, at least initially, a second layer of palladium formed on said layer of silver to a thickness in the range of about 5 Angstroms to about 25 Angstroms.

11. In an energy control window assembly, a rigid transparent base layer having front and back surfaces, and a flexible transparent polymer substrate carrying a thin film optical coating on one surface thereof and being mounted on the other surface thereof to one of said front and back surfaces of said base layer; said thin film optical coating comprising a substantially transparent metal layer and a highly transparent thin film dielectric layer formed over said metal layer, said dielectric layer comprising a mixed metal oxide layer having metal constituents of at least one lanthanide series metal and at least one transition or semiconductor metal and being characterized by substantial water vapor impermeability, said lanthanide series metal being cerium and said transition or semiconductor metal being tin and each of said dielectric layers includes relative concentrations of cerium and tin in the range of about 20:80 weight percent to about 70:30 weight percent, whereby the weatherability of said optical coating is substantially improved.

12. In an energy control window assembly a rigid transparent base layer having front and back surfaces, and a flexible transparent polymer substrate carrying a thin film optical coating on one surface thereof and being mounted on the other surface thereof to one of said front and back surfaces of said base layer; said thin film optical coating comprising a substantially transparent metal layer and a highly transparent thin film dielectric layer formed over said metal layer, said dielectric layer comprising a mixed metal oxide layer having metal constituents of at least one lanthanide series metal and at least one transition or semiconductor metal and being characterized by substantial water vapor impermeability, said lanthanide series metal being cerium and said transition or semiconductor metal being tin and each of said dielectric layers includes relative concentrations of cerium and tin in the range of about 20:80 weight percent to about 50:50 weight percent, whereby the weatherability of said optical coating is substantially improved.

13. The article of either of claims 11 or 12, wherein said thin film optical coating further comprises a second highly transparent dielectric layer formed on said polymer sheet and said thin film metal layer is formed on said second dielectric layer, said thin film metal layer comprises an alloy of silver and palladium with palladium in a concentration in the range of about one weight percent to about thirty weight percent.

14. The article of either of claims 11 or 12, wherein said thin film optical coating further comprises a second highly transparent dielectric layer formed on said polymer sheet and said thin film metal layer is formed on said second dielectric layer, said thin film metal layer initially comprises a composite of separately formed layers of palladium and silver.

15. The article of claim 14, wherein said thin film metal layer initially comprises a thin film layer of palladium formed on said substrate to a thickness in the range of about 5 Angstroms to about 25 Angstroms and a thin film layer of silver formed on said layer of palladium to a thickness of about 60 Angstroms to about 100 Angstroms.

16. The article of claim 15, wherein said thin film metal layer further comprises at least initially a second layer of palladium formed on said layer of silver to a thickness in the range of about 5 Angstroms to about 25 Angstroms.

17. The article of claim 11, wherein said thin film optical coating further comprises a second highly transparent dielectric layer formed on said polymer sheet and said thin film metal layer is formed on said second dielectric layer, each of said thin film dielectric layers has a thickness in the range of about 300 Angstroms to about 500 Angstroms; and said thin film metal layer has a thickness in the range of about 60 Angstroms to about 120 Angstroms and comprises an alloy of silver and palladium with palladium in a concentration in the range of about one weight percent to about ten weight percent and silver in a concentration of at least 90 weight percent.

18. The article of claim 11, wherein said thin film optical coating further comprises a second highly transparent dielectric layer formed on said polymer sheet and said thin film metal layer is formed on said second dielectric layer, each of said thin film dielectric layers has a thickness in the range of about 300 Angstroms to about 500 Angstroms; and said thin film metal layer at least initially comprises a composite of separately and sequentially formed layers of palladium and silver having a total thickness in the range of about 60 Angstroms to about 100 Angstroms.

19. The article of claim 18, wherein said thin film metal layer initially comprises a thin film layer of palladium formed on said substructure to a thickness in the range of about 5 Angstroms to about 25 Angstroms and a thin film layer of silver formed on said layer of palladium to a thickness in the range of about 60 Angstroms to about 100 Angstroms.

20. The article of claim 19, wherein said thin film metal layer further comprises a second layer of palladium formed on said layer of silver to a thickness in the range of about 5 Angstroms to about 25 Angstroms.

21. An energy control sheet formed by the process of:
   placing a flexible transparent substructure including a sheet of polymer material in a vacuum deposition chamber;
   depositing on said substructure a substantially transparent thin film metal layer; and
   depositing onto said thin film metal layer a highly transparent mixed metal oxide layer having metal constituents of at least one lanthanide series metal and at least one transition or semiconductor metal preselected to confer substantial water vapor impermeability to said metal oxide layer and thereby substantially to improve the weatherability of said energy control sheet; said metal oxide layer comprising a mixed cerium oxide and tin oxide layer formed by the step of evaporating a mixture of cerium oxide and tin oxide from a single source.

22. The article of claim 21, wherein said metal oxide layer comprises a mixed cerium oxide and tin oxide layer formed by the step of evaporating a mixture of cerium oxide and tin oxide from a single source.

23. The article of claim 22, wherein said single source is prepared with relative concentrations of cerium oxide and tin oxide such that, when said step of evaporation is carried out, said mixed metal oxide layer has relative concentrations of cerium and tin in the range of about 20:80 weight percent to about 70:30 weight percent.

24. The article of claim 22, wherein said single source is prepared with relative concentrations of cerium oxide and tin oxide such that when said step of evaporation is carried out, said mixed metal oxide layer has relative concentrations of cerium and tin in the range of about 20:80 weight percent to about 55:45 weight percent.

25. The article of claim 21, wherein said oxide layer comprises a mixed cerium oxide and tin oxide layer formed by the step of evaporating cerium stannate (50 mole % $CeO_2$, 50 mole % $SnO_2$).

26. The article of any of claims 21, 22 or 23, wherein said step of depositing said thin film metal layer comprises simultaneous evaporation of silver and palladium from separate sources and at individual deposition rates prearranged to produce a silver-palladium alloy film with a palladium concentration in the range of about one to fifteen weight percent.

27. The article of claim 21, wherein said step of depositing said thin film metal layer comprises the steps of forming a layer of palladium with a thickness in the range of about 5 Angstroms to about 25 Angstroms and forming on said palladium layer a layer of silver with a thickness in the range of about 60 Angstroms to about 100 Angstroms.

28. The article of claim 27, wherein said step of depositing said thin film metal layer further comprises a step of forming on said silver layer a second layer of palladium with a thickness in the range of about 5 Angstroms to about 25 Angstroms.

29. In an energy control sheet having transmittance in the visible and solar portions of the electromagnetic radiation spectrum greater than about seventy and sixty percent, respectively, and having infrared emittance substantially less than 0.2, a highly transparent substrate having first and second surfaces, a first thin film layer carried on one surface of said substrate and comprising a highly transparent dielectric material having a refractive index of 1.8 or greater and a physical thickness in the range of about 300–550 Angstroms; a thin film metal layer carried on said first thin film dielectric layer and including constituents of silver and palladium with silver in a total concentration of at least about eight-five weight percent and palladium in a concentration in the range of about one weight percent to about fifteen weight percent, said metal layer having a total thickness of about 100 Angstroms; and a second dielectric layer structure formed directly on said metal layer including at least one layer of highly transparent dielectric material carried on said metal layer and having a refractive index of 1.8 or greater with said second dielectric layer structure having an overall physical thickness in the range of about 300–650 Angstroms; said layer of dielectric material on each side of said layer of metal comprises a mixed metal oxide having metal constituents of at least one lanthanide series metal and one transition or semiconductor metal and being characterized by substantial water vapor impermeability; said lanthanide series being cerium and said transition or semiconductor material being tin and each of said dielectric layers includes relative concentrations of cerium and tin in the range of 20:80 weight percent to about 70:30 weight percent.

30. The article of claim 29, wherein said thin film metal layer comprises an alloy of silver and palladium with silver in a concentration in the range of about eighty-five weight percent to ninety-nine weight percent and palladium in a concentration in the range of about one weight percent to about fifteen weight percent.

31. The article of claim 29, wherein said thin film metal layer initially comprises a composite of separately formed layers of palladium and silver.

32. The article of claim 31, wherein said thin film metal layer initially comprises a thin film layer of palladium formed on said first thin film layer of dielectric material to a thickness in the range of about 5 Angstroms to about 25 Angstroms and a thin film layer of silver formed on said layer of palladium to a thickness in the range of about 60 Angstroms to about 100 Angstroms.

33. The article of claim 32, wherein said thin film metal layer further comprises a second layer of palladium formed on said layer of silver to a thickness in the range of about 5 Angstroms to about 25 Angstroms.

* * * * *